United States Patent [19]

Stolar et al.

[11] Patent Number: 4,619,231
[45] Date of Patent: Oct. 28, 1986

[54] SYSTEM FOR REMOTE DISABLING OF AN INTERNAL COMBUSTION ENGINE

[75] Inventors: Mike Stolar, Oakville; David B. Robertson, Hamilton; Mitchell J. Cichy, Pickering, all of Canada

[73] Assignee: Safe-T-Stop Inc., Hamilton, Canada

[21] Appl. No.: 686,369

[22] Filed: Dec. 26, 1984

[51] Int. Cl.⁴ .................. F02D 41/22; F02P 11/04
[52] U.S. Cl. .................. 123/333; 123/198 D; 123/335; 180/167; 340/53
[58] Field of Search .... 123/198 D, 198 DB, 198 DC, 123/333, 335; 180/167, 282; 340/53, 62

[56] References Cited

U.S. PATENT DOCUMENTS

| 754,406 | 3/1904 | Adamson . | |
| 914,483 | 3/1909 | Erdmonn et al. . | |
| 1,774,787 | 10/1930 | Clifford . | |
| 1,803,291 | 4/1931 | Adler, Jr. . | |
| 1,803,292 | 4/1931 | Adler, Jr. . | |
| 1,808,022 | 6/1931 | DelPrete . | |
| 1,846,032 | 2/1932 | Hart . | |
| 1,883,107 | 10/1932 | Thomas . | |
| 1,955,371 | 4/1934 | Springfield . | |
| 2,346,149 | 4/1944 | Brewer . | |
| 2,640,979 | 6/1953 | Carter . | |
| 3,007,538 | 11/1961 | Hill . | |
| 3,112,004 | 11/1963 | Neaville . | |
| 3,160,869 | 12/1964 | Rambo | 340/53 X |
| 3,203,501 | 8/1965 | Carter et al. . | |
| 3,396,811 | 8/1968 | Bowers et al. . | |
| 3,680,043 | 7/1972 | Angeloni . | |
| 3,748,641 | 7/1973 | Hartung | 340/53 |
| 3,824,538 | 7/1974 | Slemp . | |
| 3,876,940 | 4/1975 | Wickford et al. . | |
| 3,978,447 | 8/1976 | Bankes . | |
| 4,007,438 | 2/1977 | Protonantis . | |
| 4,023,549 | 5/1977 | Hewitt | 123/198 DB X |
| 4,245,598 | 1/1981 | Ruhl | 123/333 |
| 4,291,295 | 9/1981 | Arnold | 340/53 |
| 4,403,970 | 9/1983 | Dretzka et al. | 123/335 X |

FOREIGN PATENT DOCUMENTS 60390 5/1977 Japan ..................... 340/53

Primary Examiner—Tony M. Argenbright
Attorney, Agent, or Firm—Hirons, Rogers & Scott

[57] ABSTRACT

The invention provides a system applicable to various internal combustion engines, such as for automobiles, motorcycles, snowmobiles and outboards, to permit an authorized person, such as a police officer, to prevent their improper or illegal operation. The engine includes a detector detecting the speed of operation of the motor which is compared with a preset value. Upon an unusually high motor speed being reached a receiver is enabled for a preset period of time. During this preset period the engine can be disabled by a transmission from a transmitter operated by the police officer, preferably using a designated exclusive channel. The disabling slows the engine to an idle speed without stopping it, so that the power assist mechanisms of the vehicle remain operative to maintain normal braking and steering function.

13 Claims, 1 Drawing Figure

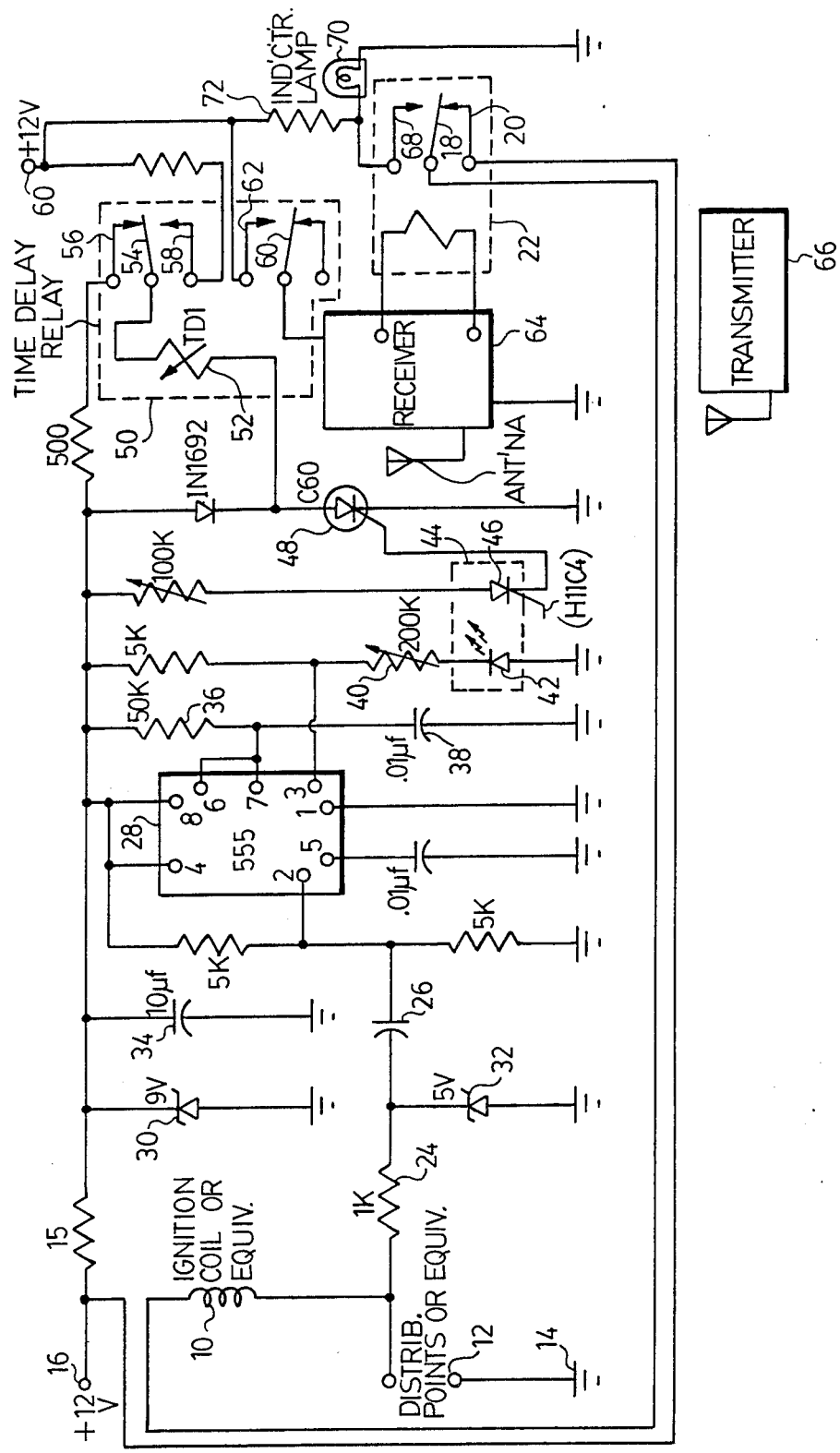

SYSTEM FOR REMOTE DISABLING OF AN INTERNAL COMBUSTION ENGINE

FIELD OF THE INVENTION

The present invention is concerned with a system enabling the deliberate remote disabling of an internal combustion engine, particularly the engine of an automobile which is being operated imprudently or illegally.

DESCRIPTION OF THE PRIOR ART

Almost since the adoption of the automobile for mass transportation there has been a problem with a very small minority of drivers who operate their vehicles with disregard to the rights of others by driving carelessly, or dangerously, or while intoxicated. There has also been a continuing problem with motorists who, when apprehended by the police, attempt to evade arrest by driving away at high speed, with the possibility of a serious accident involving both the motorist and innocent by-standers. Such action raises a serious problem for the police officer, since he must decide virtually immediately whether to allow the offender to escape, or attempt a high speed pursuit, with its consequent additional hazards and possibility of accident.

Examination of the relevant prior art U.S. patents shows that there have been numerous proposals in the past to attempt the remote stopping of vehicles by police and other authorities by means of a transmitter which, when operated, will send an appropriate signal to a receiver on the vehicle, whereupon the engine is stopped and/or some warning signal is given to the driver that he or she is in violation of a minimum standard of safety, and that action is being taken to stop them. There have also been a number of prior proposals to provide such systems operable at road/rail crossing points upon the approach of a train to stop any approaching road vehicles in order to avoid collision between them.

Examples of such systems are disclosed in U.S. Pat. Nos. 754,406; 914,483; 1,774,787; 1,803,291; 1,803,292; 1,808,022; 1,846,032; 1,883,107; 1,955,371; 2,346,149; 2,640,979; 3,007,538; 3,112,004; 3,203,501; 3,396,811; 3,680,043; 3,824,538; 3,876,940; 3,978,447; and 4,007,438.

DEFINITION OF THE INVENTION

It is therefore the principal object of the invention to provide a new system permitting the deliberate remote disabling of an internal combustion engine, particularly the engine of a motor vehicle, upon receipt of a signal from a location remote from the engine, upon the occurrence of a predetermined condition of the engine.

In accordance with the present invention there is provided a system enabling the deliberate remote disabling of an internal combustion engine upon receipt of a signal from a location remote from the engine, the system comprising:

speed detection cicuit means detecting a speed parameter of the operation of the engine;

a radio receiver which is adapted to receive a radio signal from a radio transmitter, and upon enabling of the receiver, which is adapted to produce a control signal;

comparison circuit means comparing the detected speed parameter of the engine with a present value thereof and upon detection of a speed parameter greater than the set value enabling the receiver; and disabling means responsive to the control signal to disable the engine.

Preferably, the disabling means are operative to drastically reduce the speed of operation of the engine without complete stopping thereof.

The system may include reference circuit means set or settable to correspond with the predetermined speed parameter of the engine, the comparison means comparing the value of the parameter detected by the speed detector circuit with the said predetermined value.

Preferably the time delay circuit means permitting the enabling of the radio receiver in response to the said control signal for a predetermined period of time is set by the time delay circuit means.

The speed parameter employed may be the number of revolutions of the engine per unit time, and when the engine is of the type having an electric ignition system, the engine may be disabled by the disabling means via the ignition system.

It will be noted that the receiver receiving the disabling signal from the radio transmitter is only enabled to produce a control signal upon the occurrence of a predetermined condition of the engine, such as excessive rotational speed or acceleration thereof. At all other times the receiver is not able to produce the control signal, although it may of course be operative to receive the broadcast signal from the transmitter.

It is an important preferred feature of the invention that the disabling means do not stop the engine completely but instead reduces its speed of operation drastically, such as to the condition characterised as "normal idle". This means that the power assisted equipment of the automobile, such as the power brakes and power steering, remain fully operative and there is no potential difficulty of physical control of the vehicle, as would happen when the engine is completely stopped.

It is preferred that the transmitter and receiver operate on some exclusive assigned frequency with only police officers or other appropriate authorities legally permitted to possess a transmitter capable of transmitting on that frequency. The transmitter itself could be sealed in a manner requiring breaking of the seal in order to operate it, so that the seal must be replaced each time that the transmitter is placed in operation, such replacement requiring an official report as to the occasion and reason for its operation.

A specific embodiment of the invention will now be described, by way of example, with reference to the accompanying schematic drawing, which shows the system as applied to an internal combustion automobile engine having an electric ignition circuit.

The engine comprises an ignition coil 10, or its equivalent, and a set of distributor points 12, or their equivalent, connected in series between ground 14 and a positive power source 16 via the normally closed contacts 18, 20 of a relay 22. The ignition system works normally as long as the contacts 18 and 20 are closed.

In its normal course of operation the ignition circuit generates a continuous train of pulses having a fixed ratio relationship to the speed of operation of the engine. For example, an 8-cylinder four-cycle engine operating at 4000 rpm involves the generation of 16,000 ignition pulses per minute. This train of pulses is fed via a resistor 24 and capacitor 26 to the input terminal 2 of timing circuit 28 which consists of a standard 555 I.C. as produced by suppliers, such as Motorola and RCA. The voltage supply to the timing circuit is stabilized by means of two Zener diodes 30 and 32 and a smoothing capacitor 34. The input to the timing circuit 28 therefore comprises speed detecting circuit means detecting the desired speed parameter of the operation of the engine, which in this embodiment is the number of revolutions of the engine per minute.

The timing circuit 28 also constitutes comparison circuit means comparing the detected speed parameter of the engine with a preset value thereof, set by the values of the other circuit elements 36 and 38. Upon the timing circuit 28 detecting a pulse train of 16 kHz or more, it will produce an output signal at its terminal 3 that is supplied via adjustable potentiometer 40 to a light emitting diode (LED) 42, the level of signal at which the LED is activated being set by potentiometer 40. The LED 42 is part of a unit 44 constituting an opto-electronic circuit, which is able to provide electrical isolation between the two parts of the electric circuit which it connects. Thus, the light emitted by LED 42 activates a light-sensitive SCR 46, the output of which then fires a power SCR 48. The firing of the power SCR produces a current pulse which is fed to a time delay relay 50 to cause operation thereof for a preset time delay period, the length of which is set by a variable impedance 52 via lock-up contacts 54, 56 and 58. The relay is supplied with operating current from a separate positive power source 60.

The relay 50 also includes receiver enabling contacts 60 and 62 which, upon closing, supply power to a receiver 64 and place it in operative condition to receive a broadcast signal from a remote radio transmitter 66. As previously described, it is expected that the transmitter and receiver will be operative upon an exclusive assigned frequency which is available legally only to police authorities. It is also contemplated that the transmitter will be a sealed unit that is only operable upon breaking of the seal, so that breakage of the seal must be explained by a formal report upon its replacement.

It will be seen therefore that the receiver 64 is only available to receive a signal from the transmitter in the event that the engine of the vehicle has reached a speed of 4000 rpm, which is a very high speed for normal operation of the average 8-cylinder automobile engine, indicating that some unusual activity is taking place, such as the driver attempting to speed excessively, as would be occasioned by an attempt to evade arrest. Once the control signal is received and the receiver is activated it remains in this operative condition for the time delay period set by the control element 52 of the time delay relay 50. Quick cessation of the unusual activity will restore the receiver to the inoperative state after the time delay period, unless the activity is resumed.

If a signal is received from the transmitter while the receiver is in this condition the output of the receiver causes operation of the relay 22, whereupon contacts 18 and 68 close and an indicator lamp 70 is lit. An additional impedance 72 is now connected by the relay 22 in series with the ignition coil 10 and distributor points 12, the value of the impedance being such that its inclusion in the circuit will cause a drastic reduction in the speed of operation of the engine, but without stopping it completely. As previously described, the speed of the engine now cannot rise above an "idle" speed, at which the vehicle can continue to move, but only at a correspondingly very slow speed. Any power assist mechanisms of the vehicle, such as the power brakes and power steering, will continue to function normally, so that the operation of the brakes and steering remains normally controllable, which would not be the case if the engine stopped completely.

It will be seen that, in operation, if the police officer or other custodian of a transmitter 66 encounters a situation where an automobile is being driven at dangerously high speeds, or the driver attempts to drive away from the scene of an interception with high acceleration, then the receiver 64 will immediately be enabled. The officer can then quickly unseal the transmitter and actuate it, whereupon the automobile will be disabled to the extent that it can no longer continue with such unwanted speed or acceleration, but with the possibility of control of the brakes and steering fully retained.

The system particular described is intended for use in conjunction with an engine having an electric ignition circuit. The equivalent system for use in conjunction with a compression ignition engine could control the supply of fuel to the engine, via the fuel injector. Thus, upon the receiver being enabled and the transmitted signal being received, the fuel injector would be controlled so that the engine is supplied with only fuel for it to idle.

The speed of detection required to be measured by the timing circuit 28 depends of course upon the number of cylinders of the engine, and also upon the speed that is characteristic of normal operation of the engine and the level of abnormal operation to be detected. It is well understood that the normal operating speed of an engine usually is higher as the number of cylinders decreases.

In the system described the engine speed parameter that is detected and used for control is the speed of the engine, but it is also possible to employ as the parameter the rate of change of the speed of operation of the engine. Thus, any attempt to accelerate the engine quickly above a predetermined rate would result in enabling of the receiver, so that the transmitter would be effective.

The invention has been described in association with an automobile engine, but it will be apparent that it may also be applied to other engines such as motocycles, snowmobiles and out-board engines, all of which may on occasion be operated improperly or illegally.

We claim:

1. A system for the deliberate remote disabling of an internal combustion enginer upon receipt by the engine of a disable signal from a location remote from the engine, the system comprising:

speed detecting and comparison circuit means for connection to the engine to detect the speed thereof and to produce therein a speed signal representative of the current speed or acceleration of the engine; the said circuit means comparing the speed signal with a preset signal value representative of a predetermined speed or acceleration of the engine above which it may be disabled, and producing a receiver enabling signal when the speed signal represents a speed or acceleration greater than the said predetermined value;

a radio transmitter operable by an operator to produce a broadcast disable signal;

a radio receiver connected to the speed detector and comparison circuit means to receive and be enabled by the said enabling signal, and upon receipt of the said broadcast disable signal while enabled producing a disable control signal; and disabling means for connection to the engine to disable it, the disabling means being connected to the receiver to receive therefrom the disable control signal and upon receipt thereof being operative to disable the engine.

2. A system as claimed in claim 1, wherein the disabling means are operative to disable the engine by drastically reducing its speed of operation without complete stopping thereof.

3. A system as claimed in claim 1, and including time delay circuit means connected between the speed detecting and comparison circuit means and the radio receiver and permitting the enabling of the radio receiver in response to receipt of the said disable control signal for a predetermined period of time set by the time delay circuit means.

4. A system as claimed in claim 2, and including time delay circuit means connected between the speed detecting and comparison circuit means and the radio receiver and permitting the enabling of the radio receiver in response to receipt of the said disable control signal for a predetermined time delay period set by the time delay circuit means.

5. A system as claimed in claim 3, wherein the time delay period is from about ten seconds to five minutes.

6. A system as claimed in claim 1, and including reference circuit means set or settable to correspond with the predetermined speed or acceleration of the engine, the speed detecting and comparison means comparing the value of the speed or acceleration detected by the speed detector cicuit with the said predetermined value.

7. A system as claimed in claim 1, wherein the speed of the engine is detected by measurement of the number of revolutions of the engine per unit of time.

8. A system as claimed in claim 1, wherein the acceleration of the enginer is detected by measurement of the rate of increase of the number of revolutions of the engine per unit of time.

9. A system as claimed in claim 1, wherein the engine is of the type having a electric ignition system and the engine is disabled by the disabling means via the ignition system.

10. A system as claimed in claim 1, wherein the engine is of the type having a electric ignition system and the engine is disabled by the disabling means adding an electric load to the ignition system.

11. A system as claimed in claim 1, wherein the engine is disabled by the disabling means reducing the fuel supply to the engine.

12. A system as claimed in claim 1, wherein the engine is of the compression ignition type and the engine is disabled by the disabling means, reducing the fuel supply to the engine.

13. A system as claimed in claim 1, including an optoelectronic link between the speed detecting and comparison circuit means and the radio receiver to isolate the respective means electrically from one another, said link comprising a light source that is lit upon supply thereto of a receiver enabling signal input from the said circuit means, and a light sensitive detector detecting the lighting of the light source and producing in response thereto a corresponding receiver enabling signal output supplied to the radio receiver.

* * * * *